United States Patent [19]

Clarke, Jr.

[11] Patent Number: 5,720,329

[45] Date of Patent: Feb. 24, 1998

[54] APPARATUS FOR VEHICLE DISTRIBUTION OF SOLID INSECTICIDE-CARRYING BODIES

[75] Inventor: John L. Clarke, Jr., Riverside, Ill.

[73] Assignee: Clarke Mosquito Control Products, Inc., Roselle, Ill.

[21] Appl. No.: 406,479

[22] Filed: Mar. 20, 1995

[51] Int. Cl.$^6$ .............................. B65B 39/00; B67C 11/04
[52] U.S. Cl. .......................... 141/331; 224/482; 248/94; 248/311.2
[58] Field of Search .................... 424/405, 93.5, 424/493, 403; 224/42.45, 42.42, 42.44, 42.32, 482; 141/331, 333, 334; 248/94, 311.2

[56] References Cited

U.S. PATENT DOCUMENTS

| | | | |
|---|---|---|---|
| 3,723,615 | 3/1973 | Okuno | 424/18 |
| 3,899,012 | 8/1975 | Sather | 141/331 |
| 3,985,539 | 10/1976 | Bailey | 71/66 |
| 5,180,089 | 1/1993 | Suman et al. | 224/42.45 |
| 5,228,488 | 7/1993 | Fletcher | 141/331 |
| 5,349,997 | 9/1994 | Rial | 141/331 |
| 5,360,607 | 11/1994 | Eyal et al. | 424/93.5 |

Primary Examiner—Thurman K. Page
Assistant Examiner—William E. Benston, Jr.
Attorney, Agent, or Firm—Dorn, McEachran, Jambor & Keating

[57] ABSTRACT

An apparatus for vehicle distribution of solid insecticide-carrying pellets or briquets into bodies of water such as catch basins includes a bracket which is formed and adapted to be supported on the door of a vehicle with the window rolled down. Preferably, the bracket is positioned adjacent the vehicle operator's driving position. The bracket extends outside of the vehicle and has an opening therein. A funnel and a tube are positioned at a location to be accessible to the driver with the tube extending through the bracket opening. The relative sizes of the tube and the opening permit movement of the tube therein so that the vehicle operator may direct the tube to a desired location for application of an insecticide-carrying pellet or briquet. The funnel extends upwardly to a height relative to the bracket which permits the vehicle operator to place an insecticide-carrying pellet therein. There is a container attached to the bracket, preferably on the inside of the vehicle and accessible to the vehicle operator such that the operator may take a pellet from the container and place it in the funnel and then direct the funnel and tube to a desired location, all while remaining in the vehicle operator's driving position. There is a counter positioned on the bracket between the funnel and the container so that the vehicle operator may register each application of an insecticide pellet.

8 Claims, 1 Drawing Sheet

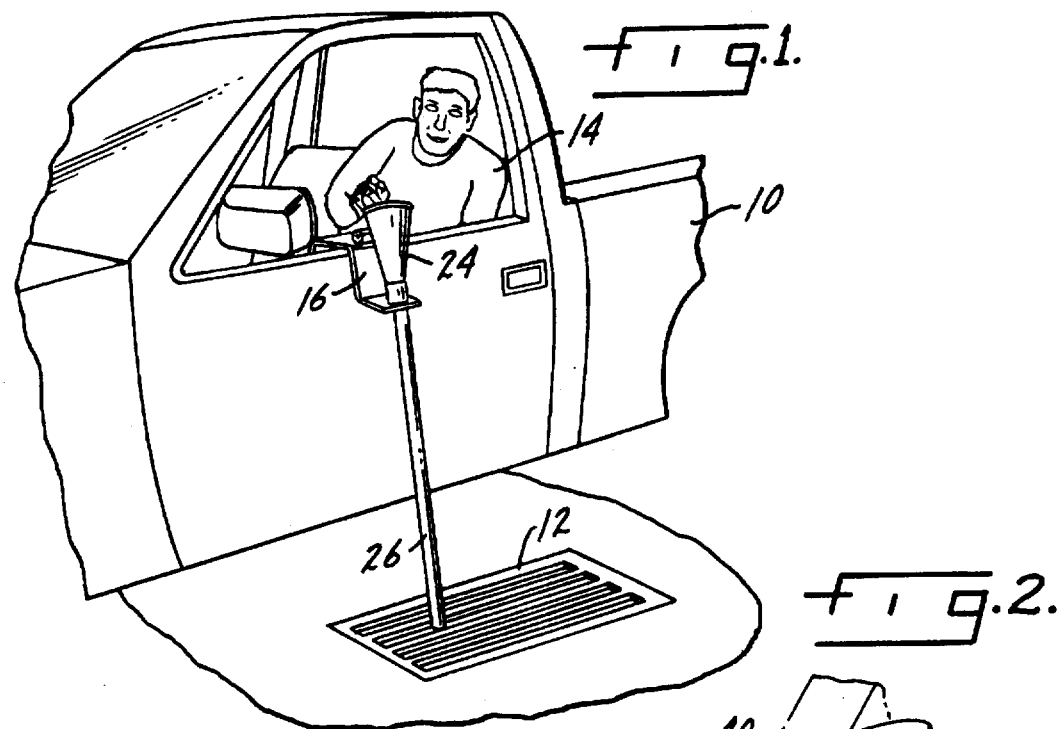
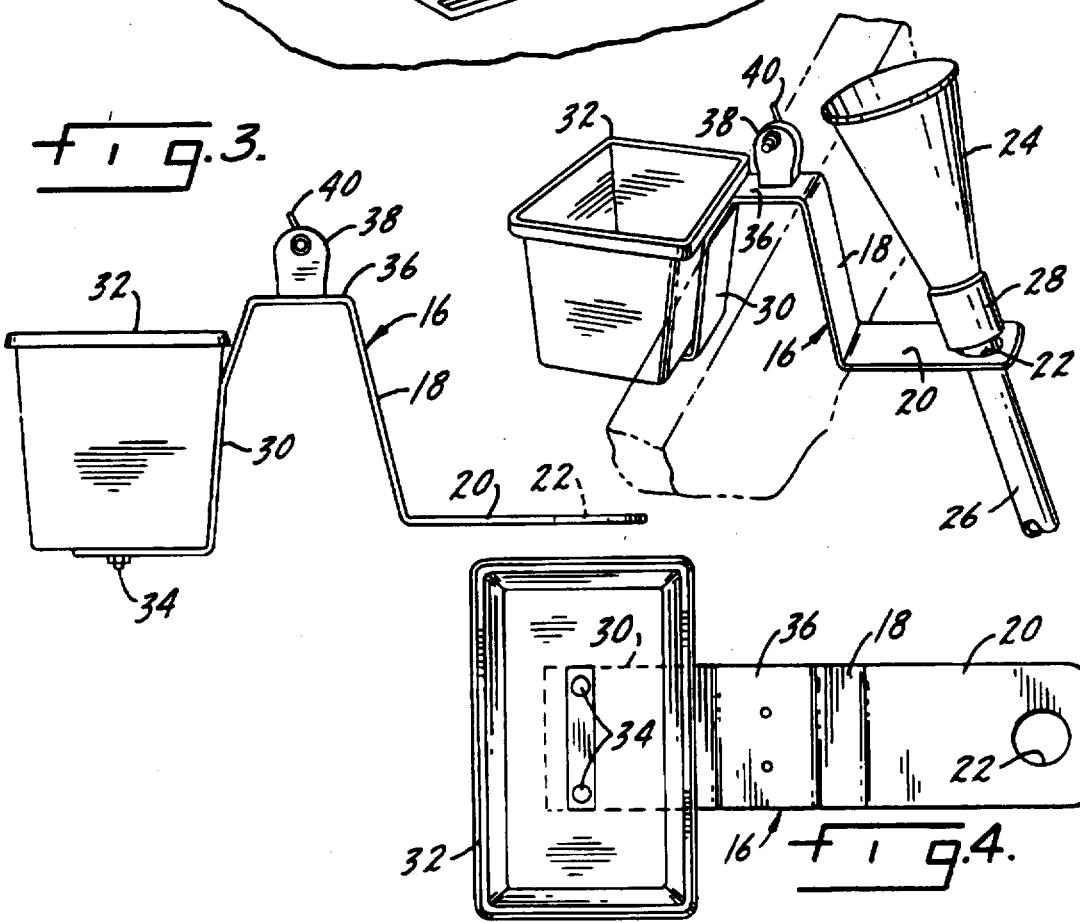

APPARATUS FOR VEHICLE DISTRIBUTION OF SOLID INSECTICIDE-CARRYING BODIES

THE FIELD OF THE INVENTION

As is well known in the art, mosquitos breed in stagnant water and catch basins are a favored breeding ground for mosquitos in urban areas. Catch basins always contain some water and they are normally dark and moist during the day, an ideal breeding situation for mosquito larvae. Normally, mosquitos will cling to the sides of the catch basin during the day and leave during the dusk and evening hours where they cause the well known annoyance to humans and animals and have the potential for being carriers of various forms of disease.

It has been common practice in mosquito abatement districts, in the past, to attach spraying machines to vehicles and these vehicles will drive slowly down a street spraying the walls of catch basins. This had been the practice for many years until it was determined that spraying insecticides had the potential for being an environmental hazard. The current practice in preventing the breeding of mosquitos in catch basins is for a vehicle to drive from catch basin to catch basin with the operator placing slow release insecticide pellets or briquets into the catch basin. Normally, such pellets or briquets have a release time of approximately 30 days which will prevent the breeding of mosquitos therein for approximately that period of time. However, it is unwieldy, slow and inefficient, and therefore not economical, for the driver of a vehicle to stop over each catch basin and try to aim and toss briquets or pellets so they will pass through the catch basin grate into the water below.

The present invention provides a device for use in vehicle distribution of solid insecticide-carrying pellets or briquets into catch basins which is readily usable by the driver, provides a container for the briquets or pellets, and has a means whereby the driver may aim the distribution device directly into the catch basin without leaving the vehicle and without requiring the driver to leave the driving position.

SUMMARY OF THE INVENTION

The present invention relates to an apparatus for vehicle distribution of solid insecticide-carrying pellets or briquets into bodies of water such as a catch basin.

A primary purpose of the invention is an apparatus of the type described which is placed in position on the vehicle door adjacent the vehicle driver or passenger, has a supply of briquets or pellets at a readily accessible location, and provides means for the operator to direct the pellet to a predetermined destination.

Another purpose is an insecticide-carrying pellet or briquet distribution apparatus for the use described which is simple in construction and reliably operable.

Another purpose is an apparatus of the type described which includes, in combination, a container for insecticide pellets or briquets, a counter for registering the application of each pellet or briquet, and a funnel and tube to direct the briquet or pellet to a desired location.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of the invention as applied to a vehicle and illustrating the use of the distribution apparatus to apply a pellet or briquet to a catch basin, FIG. 2 is an enlarged perspective of the apparatus disclosed herein, FIG. 3 is a side view of the apparatus of FIG. 2, and FIG. 4 is a top view of the apparatus disclosed herein.

DESCRIPTION OF THE PREFERRED EMBODIMENT

It is common practice in preventing the breeding of mosquitos in stagnant bodies of water such as catch basins to apply insecticide or pesticide pellets or briquets in which the chemical is bonded within a gypsum base. U.S. Pat. No. 4,876,091 discloses a gypsum-based insecticide pellet and method of manufacturing the same. U.S. Pat. Nos. 4,670,039 and 4,732,762 disclose gypsum briquets for the same purpose. The present invention has application to both gypsum pellets and briquets and the only essential difference between the two is size. Normally, briquets are a larger size gypsum element than a pellet. The terms will be used interchangeably herein and although the claims may refer to pellets, it should be understood that this has application to any solid body in which an insecticide or pesticide is bonded for slow release distribution to control the breeding of mosquitos. Various types of pesticides may be used such as Abate, Altosid, or Dursban, again in either pellet or briquet form and bonded with gypsum or another bonding agent for slow release.

In FIG. 1, a vehicle such as a truck is indicated at 10 and a typical catch basin is indicated at 12. Normally, the catch basin will be on a street such that a vehicle can drive adjacent to it. The driver of the vehicle is indicated at 14 and the driver is shown in the driving position on the left side of the vehicle, although in some vehicles for this purpose the driving position may be on the right side. The window of the vehicle or truck 10 is rolled down and the distribution apparatus of the present invention is applied over the rolled-down window and onto the door of the vehicle. In some applications the driver will control application of the briquets, whereas, in other situations there will be both a driver and a passenger in the vehicle and the passenger will function as the operator of the distribution apparatus.

The apparatus as indicated particularly in FIGS. 2, 3 and 4 includes a bracket 16 which has a truncated portion 18 which fits over the vehicle door and has an exterior outwardly extending portion 20 having an opening 22 therein.

A funnel is indicated at 24 and the funnel is attached to a tube 26 by a sleeve 28. The outer diameter of the tube 26 will be slightly smaller than the diameter of the opening 22 so that the tube is loosely positioned within the opening. The sleeve 28, however, has an outer diameter greater than that of the opening so that the funnel cannot fall through the bracket. The difference in diameters between the tube 26 and the opening 22 permits the funnel and tube to be oscillated by the operator to aim the bottom of the tube at an opening in the catch basin 12. Normally, the length of the tube will be suited to the particular type of vehicle as the tube should end slightly above the catch basin and should not drag on the ground.

The bracket 16 has an interior portion 30 upon which is mounted a container 32. The container 32 may be bolted, for example by bolts 34, to the bottom of bracket portion 30. The container will be positioned on the inside of the vehicle and readily accessible to the operator. Positioned on a top portion 36 of the bracket 16 is a counter 38 having a lever 40. The counter 38 is readily accessible to the operator so that at each application of an insecticide pellet he may register that application on the counter. Preferably, the container 32 will hold sufficient pellets or briquets for a full day's application.

In use, the vehicle operator will move the vehicle down the street from catch basin to catch basin. Normally, such can be found at the corners where streets cross, or sometimes between cross streets. When the driver reaches a catch basin, the vehicle will stop and the funnel and joined tube will be aimed to a space in the catch basin grate. The operator will then place a pellet from the container 32 into the funnel, with the pellet falling down through the funnel and tube and into the catch basin. The operator can then register the application on the counter 38.

Of importance is the fact that the entire distribution apparatus is positioned at an accessible location on the door of the vehicle. The operator does not have to move from the driving position, does not have to open the door to lean out and release the briquet by hand, does not have to dismount from the vehicle or move from one side to the other. The apparatus provides for the very efficient distribution-of mosquito combating insecticides or pesticides in pellet or briquet form, in a swift and economical manner.

Whereas the preferred form of the invention has been shown and described herein, it should be realized that there may be many modifications, substitutions and alterations thereto.

The embodiments of the invention in which an exclusive property or privilege is claimed are defined as follows:

1. An apparatus for vehicle distribution of solid insecticide-carrying pellets into bodies of water, including a bracket formed and adapted to be supported on a vehicle in a position adjacent to and accessible by an operator within the vehicle, said bracket having an opening on one side thereof at a location which will be outside of the vehicle when the bracket is mounted thereon, a funnel and a tube connected thereto, with said tube extending through said bracket opening, the relative sizes of said tube and said opening permitting oscillating movement of the tube therein whereby the vehicle operator may direct the tube to a desired location, said funnel extending to a height relative to said bracket which permits the vehicle operator to place insecticide-carrying pellets therein and the vehicle operator may then direct the funnel and tube toward a desired place of application, and a container for insecticide-carrying pellets attached to said bracket at a location accessible to the vehicle operator whereby the operator may take insecticide-carrying pellets from the container and place them in the funnel for application as described.

2. The apparatus of claim 1 wherein the bracket is formed and adapted to fit over the door of a vehicle, when the window of the door is rolled down.

3. The apparatus of claim 1 wherein the bracket extends over the door of a vehicle, with the bracket opening being on the outside of the vehicle, and the container for insecticide-carrying pellets being on the inside of the vehicle.

4. The apparatus of claim 3 wherein there is a counter attached to the bracket at a location accessible to the vehicle operator for registering the placement of insecticide-carrying pellets within the funnel.

5. The apparatus of claim 4 wherein said counter is mounted on said bracket between said funnel and said container.

6. The apparatus of claim 1 wherein said funnel is joined to said tube by a sleeve, the outer diameter of said sleeve being larger than the diameter of said opening which maintains the funnel at a predetermined height relative to the bracket.

7. The apparatus of claim 6 wherein said tube has an outer diameter smaller than that of said opening.

8. The apparatus of claim 1 wherein said bracket has a central truncated portion formed to fit over and extend downwardly along the sides of a vehicle door, an outwardly extending projection at the lower end of said truncated portion, said opening being formed in said outwardly extending projection, and a further outwardly extending projection on the opposite side of said truncated portion from said first identified projection, said container being mounted on said further outwardly extending projection.

* * * * *